April 17, 1962   M. O. STERN   3,029,643

PRESSURE GAUGE

Filed July 31, 1959

Inventor
MARTIN O. STERN
By Soans, Anderson, Luedeka & Fitch
Attys

United States Patent Office 3,029,643
Patented Apr. 17, 1962

3,029,643
PRESSURE GAUGE
Martin O. Stern, San Diego, Calif., assignor to General Dynamics Corporation, New York, N.Y., a corporation of Delaware
Filed July 31, 1959, Ser. No. 830,920
9 Claims. (Cl. 73—398)

The present invention relates generally to pressure measuring devices, and more particularly to a pressure gauge for measuring rapid variations in pressure.

Commercially available pressure gauges, such as manometers, bourdon gauges, strain gauges, etc., depend upon some form of mechanical movement for operation. Because of friction, inertia, etc., frequency of response of such devices is limited. Hence they are only able to indicate the average value of rapid pressure fluctuations.

An object of the present invention is the provision of an improved pressure gauge. Another object is the provision of a calibrated high frequency pressure gauge. A further object of the present invention is to provide a novel calibrating method for the pressure gauge of the present invention. Still a further object is the provision of a high frequency, calibrated pressure gauge which is simple in construction and rugged in use.

Other objects and advantages of the present invention will become apparent by reference to the following description and accompanying drawings.

Figure 1:
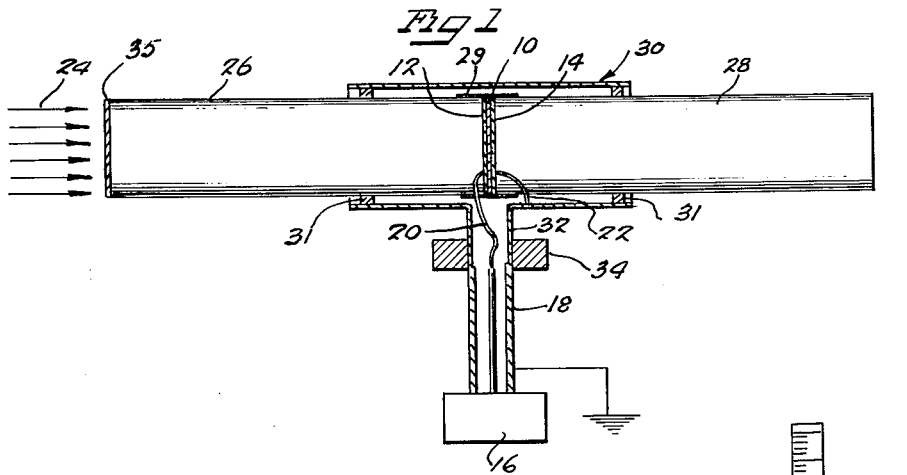
FIGURE 1 is a schematic sectional view of a pressure gauge in accordance with the present invention.

A pressure gauge in accordance with the present invention comprises a piezoelectric wafer, which is held in a fixed position with one face extending generally perpendicular to the direction of the pressure pulses to be measured. A transmission line extends from at least one face of the wafer. Means are provided for indicating an electrical property of the wafer which is changed by the pressure pulses.

Referring now to the drawings, the sensitive element of the pressure gauge is an extremely thin wafer 10 cut from a piezoelectric crystal, such as tourmaline, barium titanate, quartz, etc. The wafer 10 is cut with respect to the natural crystallographic axes so that when subject to mechanical deformation the crystal wafer 10 will develop surface charges of opposite polarity on the opposite faces of the crystal wafer 10. In the illustrated embodiment, an X-cut quartz crystal wafer 10 is provided, that is, the wafer 10 is cut from a piezoelectric crystal so that its thickness or smallest dimension extends along the X-axis of the crystal.

The sensitivity of a piezoelectric wafer to pressure pulses decreases as the frequency of the pressure pulse approaches the resonant frequency of the wafer. Since a piezoelectric or crystal wafer resonates at a frequency at which its thickness is equal to a half wave length, the crystal wafer should be sufficiently thin to place the resonant frequency well above the maximum frequency of the pressure pulse in order to obtain a linear frequency response beyond the frequency of the pressure pulse to be measured.

It has been found that for linear frequency response the thickness ($d$) of the wafer should be made approximately equal to the velocity of sound ($a$) through the wafer material divided by the frequency ($f$) of the pulse times $2\pi$, that is $$d \approx \frac{a}{2\pi f}$$

For example, to measure frequencies of 2 megacycles per second or less, a quartz wafer should be made approximately .05 centimeter thick.

The opposite charges developed on the opposite faces of the wafer 10 are measured by conductive sheets 12 and 14 formed of metal or the like disposed against the opposite faces. In the illustrated embodiment, since quartz, which has a relatively low capacitance, is used as the wafer 10, the potential difference between the sheets 12 and 14 is measured by a suitable voltage indicating means, such as an oscilloscope 16. The oscilloscope 16 is connected through a suitably grounded coaxial cable 18 to a pair of conductors 20 and 22 which, in turn, are connected respectively to the sheets 12 and 14.

In the illustrated embodiment, the crystal wafer 10 is isolated from temperature changes associated with the pressure pulses being measured (indicated by the arrows 24) by an acoustic transmission line 26 extending between one metallic sheet 12 and the pressure pulses 24 to be measured. The pressure pulses 24 set up compressional waves in the acoustic line 26 which travel along the line 26 and strike the crystal wafer 10 and thereby cause mechanical stresses in the wafer 10. The acoustic line 26 is in the form of a rod which is made of a suitable low attenuation transmission material, such as fused quartz, metal, lithium fluoride, etc., the ends of the rod being ground flat. Preferably, in order to inhibit reflection of the compressional waves, the acoustic line 26 is preferably made of the same material as the crystal wafer 10.

In order to prevent the compressional waves that are transmitted by the acoustic line 26 from being reflected at the far face of the crystal wafer 10, a second acoustic transmission line 28 is extended outwardly from the other metallic sheet 14. In the illustrated embodiment, the transmission line 28 is a fused quartz rod, the ends of which are ground flat. The rod 28 is disposed in longitudinal alignment with the transmission rod 26, the crystal wafer 10 and the metallic sheets 12 and 14 being sandwiched between the opposed ends of the rods 26 and 28.

The second acoustic line 28 is made of sufficient length to enable the original pressure pulse to be discerned from the delayed pulse reflected from the outer face of the acoustic line 28. If one desires, the acoustic line 28 may be made long enough to attenuate or absorb the pressure pulse. For example, a 7 cm. long rod is of sufficient length for 5 microsecond pulses so that the reflected wave may be discerned.

In certain applications where the original pressure pulse is obscured by extraneous pickup, the reflected pulse may be utilized to determine the pressure of the original pulse.

Since any air space attenuates the compressional wave, the total air space, which includes the spaces between the opposed ends of the rods 26 and 28 and the metallic sheets 12 and 14, and the spaces between the metallic sheets 12 and 14 and the crystal wafer 10, is made as small as possible. For example, to pass frequencies up to approximately 2 megacycles without undue attenuation, a total air space of 30 angstroms should not be exceeded. To reduce the total air space as much as possible, the metallic sheets 12 and 14 may be formed by coating the opposed ends of the rods 26 and 28 with a layer of conductive metal.

The rods 26 and 28 and their associated coated metallic sheets 12 and 14 are maintained in relationship with each other and with the crystal wafer 10 by suitable joining means, such as a thin coating 29 of thermal setting epoxy, disposed on the rods 26 and 28 and wafer 10. Since piezoelectric crystals gradually lose any charge developed thereon, any deformation of the crystal wafer 10 caused by joining means disappears after a time interval.

In order to reduce the pickup from stray magnetic and electrostatic fields, the wafer 10 and sheets 12 and 14 are enclosed with a tubular metallic shield 30, which is spaced from the sheets 12 and 14 and wafer 10 by suitable spacers 31. The shield 30 is connected to the coaxial cable 18 by a short tubular stub 32, which serves to shield the ungrounded conductor 20.

In operation, the gauge is supported by suitable means, such as a clamp 34 connected to the stub 32, so that the pressure pulses 24 only impinge on the outer end of the transmission rod 26. In certain applications it may be desirable to suitably shield the sides of the gauge to avoid false readings.

When a pressure pulse strikes the outer end of the transmission rod 26, it generates a compressional wave in the rod 26 which is carried thereby to the wafer 10. At the wafer 10 the wave produces a voltage pulse which is proportional to the pressure pulse and approximately of the same shape, that is $$V_0 = Cp \qquad (1)$$

where $V_0$ equals the voltage, $p$ equals the pressure and $C$ equals a calibration constant depending upon the properties of the gauge.

In one embodiment of the pressure gauge, the transmission line and the absorption line were made of fused quartz rod and were approximately 7 cm. long and 0.7 cm. in diameter. The wafer was cut from a quartz crystal and was 0.7 cm. in diameter and about 0.02 cm. thick. The sheets 12 and 14 were formed by coating the ends of the rods 26 and 28 that were to be joined to the wafer 10 with a conducting film. The wafer 10 and rods 26 and 28 were joined together by a thin layer of thermal setting epoxy. This pressure gauge adequately measured pressure pulses having a duration of 5 microseconds and amplitudes of 1 pound/sq. in. or more.

So that the gauge may be utilized to measure the amplitude of pressure pulses in standard units, the indicating means 16 is calibrated by applying standard pressure impulses to the end of the transmission rod 26. Since the transmission lines 26 and 28 and the crystal wafer 10 are not entirely frequency independent, the indicating means 16 is preferably calibrated with standard pressure impulses having approximately the same frequency as the pressure pulses to be measured.

In some applications it is necessary to measure pressure pulses of very short duration, as for example, 5 microseconds. Consequently, mechanical impulse device are unsuitable for applying standard pressure impulses to the transmission rod 26, since the shortest impulse obtainable from such devices is of the order of a 100 microseconds for sufficiently strong impulses.

Figure 2:
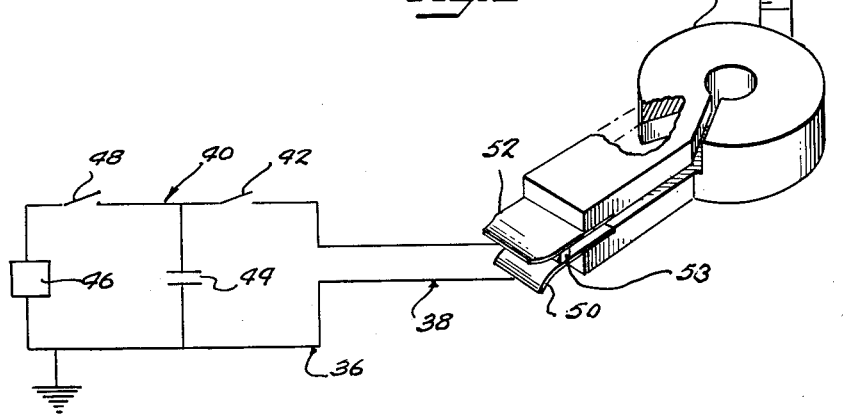
FIGURE 2 is a schematic view of the calibrating means for the pressure gauge shown in FIGURE 1.

In the illustrated embodiment, suitable high frequency standard pressure impulses are applied to the outer end of the transmission rod 26 through the interaction between a plate member or disc 35 of conductive metal, such as copper, aluminum, etc., which is suitably connected, as by gluing, to the outer end of the transmission rod 26, and a pulsed magnetic field generated by a calibrating circuit 36 (see FIGURE 2). The disc 35 is preferably made of a greater thickness than its skin depth at the frequency of the pulsed magnetic field so that the pulsed magnetic field interacts with the disc 35 for substantially all of its time interval.

As shown in FIGURE 2, the calibrating circuit 36 includes a single coil 37 of conductive material connected through a two wire high voltage cable 38 to a pulsing circuit 40. The pulsing circuit 40 includes a switch 42, such as an ignitron, etc., connected in series with a condenser 44. The condenser 44 is charged by a suitable high voltage power supply 46 which is connected through a switch 48 to the power supply.

So that the calibrating circuit 36 does not oscillate and thereby produce several pulsed magnetic fields for each discharge of the condenser 44, the calibrating circuit 36 is critically damped by adding resistance thereto. In the illustrated embodiment, in order to add resistance without appreciably increasing the inductance of the circuit, the resistance is added to the circuit in the form of a pair of spaced apart, parallel strips 50 and 52 of resistive material, such as stainless steel, etc. connected between the coil 37 and the cable 38. The strips 50 and 52 are maintained in spaced apart relationship by suitable spacers 53. An increase in the inductance of the circuit would result in an undesirable increase in the length of the current pulse.

In one embodiment, the disc 35 was made of aluminum and was 0.040 cm. thick and 0.7 cm. in diameter. The condenser 44 had a value of 14 microfarads and was charged to a maximum voltage of 10,000 volts.

To apply standard pressure impulses to the gauge, the gauge with the disc 35 attached thereto is supported by the clamp 34 so that the disc 35 is in abutting relationship with the upper surface of the coil 37. The switch 48 is closed for a sufficient time interval to charge the condenser 44. When switch 42 is closed, a high current pulse flows through the coil 37 and generates a pulsed magnetic field that strikes the disc 35. The resulting pressure impulse on the disc 35 generates a compression wave in the transmission line 26 which is carried to the wafer 10 where it is converted into a voltage pulse which is proportional to the pressure impulse and of substantially the same shape.

While the pulsed magnetic field develops a suitable high frequency pressure impulse in the gauge, it is necessary, in order to complete the calibration of the gauge, to determine the calibration constant (C) of the gauge (see (1) above). The output voltage ($V_0$) may be determined from the oscilloscope 16 but it is very difficult to determine the amplitude of the standard pressure impulse ($p$) directly, since the amplitude of the magnetic field near the disc 35 is difficult to accurately measure.

Figure 3:
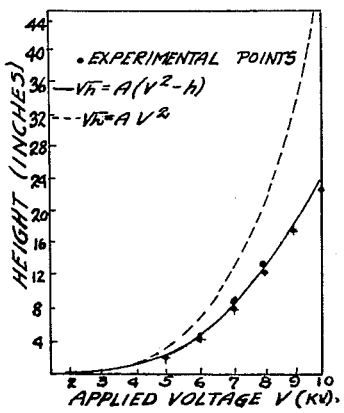
FIGURE 3 is a line graph showing the relationship between the height to which a calibrating disc is raised and the voltage applied to the calibrating means.

The amplitude of the standard pressure impulse ($p$) may be calculated but, for ease of calibrating and for accuracy, the amplitude of the pressure impulse ($p$) is preferably determined by measuring the height to which the pressure impulse lifts the disc 35 against gravity in the absence of air friction. This is accomplished by detaching the disc 35 from the transmission line 26 and placing it on top of the coil 37. The detached disc 35 is then lifted against gravity and the maximum height to which it is lifted is determined by a suitable scale 54. The height is then plotted as a function of the voltage to which the condenser 44 is charged, as shown in FIGURE 3 by the solid points.

It has been found that a curve (the solid curve in FIGURE 3) represented by $$\sqrt{h} = AV^2 - Ah \qquad (2)$$

where $h$ is the maximum height to which the disc 35 is lifted, $A$ is a constant depending upon the size, shape, and material of the disc, and $V$ is the voltage to which the condenser 44 is charged, may be drawn approximately through the experimental points. From the curve, the value of $A$ may be determined.

Since $h$ is the height to which the disc 35 is lifted in the presence of air, a correction must be made to compensate for air friction. It has been found that the last term in (2) represents the effect of air friction and by eliminating this term (2) becomes $$\sqrt{h} = AV^2 \qquad (3)$$

This is illustrated by the dotted curve in FIGURE 3.

The pressure impulse (M) applied to detached disc 35 for a given voltage (V) on the condenser 44 may be determined by substituting the height determined from the dotted curve in FIGURE 3 at the given applied voltage (V) into $$M = mv_1 = m\sqrt{2gh} \qquad (4)$$

where $m$ equals the mass of the disc 35 and $g$ equals the acceleration due to gravity. The impulse (M) obtained is then substituted in the following manner into (1) to obtain the calibrating constant (C).

For all impulses (M) which result in measurable quantities, $$M \approx \iint p \, dA \, dt \qquad (5)$$

where A equals the cross sectional area of the disc 35, is a good approximation.

Pressure ($p$) may vary over the cross sectional area (A) of the disc 35 and therefore (1) may be written $$V_o = \frac{C}{A} \int p \, dA \qquad (6)$$

The output voltage ($V_o$) and the pressure ($p$) are pulses and therefore vary with time. Accordingly (6) may be written $$\int V_o \, dt = \frac{C}{A} \iint p \, dA \, dt \qquad (7)$$

Substituting (5) in (7), $$\int V_o \, dt = \frac{C}{A} M = \frac{C}{A} \sqrt{2gh} \qquad (8)$$

With the cross sectional area (A), height ($h$), acceleration due to gravity ($g$) being known, and the integral of the output voltage being easily determined from the oscilloscope trace, the value of calibrating constant (C) may be calculated. Once the value of the calibrating constant (C) is obtained, it is a simple matter when operating the gauge to substitute the voltage determined by the oscilloscope into (1) in order to determine the amplitude of an unknown pressure.

It should be realized that the gauge may be used to measure any energy pulse which produces a compressional wave in the gauge, such as fluid pressure pulses, mechanical impulses, magnetic pressure pulses, thermal expansion pulses, etc. To measure such energy pulses the disc 35 may be retained on the end of the transmission line 26 or, if the disc 35 interferes with the measurement, it may be removed. Moreover, transducers may be connected to the end of the transmission line 26 to convert the energy pulses into pressure pulses.

From the above it can be seen that a rugged pressure measuring gauge is provided which measures the amplitude of pressure pulses in standard units of measurement. The gauge has a linear frequency response up to a relatively high frequency, and because of its low attenuation is relatively sensitive to small signals.

Various changes may be made in the above described pressure measuring gauge without departing from the spirit or scope of this invention.

Various of the features of the invention are set forth in the accompanying claims.

I claim:

1. A gauge for measuring pressure pulses, comprising a piezoelectric crystal wafer, means for holding said crystal wafer in a fixed position with one face extending generally perpendicular to the direction of the pressure pulses to be measured, said wafer having a resonant frequency which is large compared to the frequency of the pressure pulses, an elongated acoustic transmission line extending from at least one face of said wafer, means for indicating an electrical property of said crystal wafer which is changed by the pressure pulses, and a conductive member in acoustical communication with said one face for calibrating said indicating means against standard pressure pulses, said conductive member being characterized by the ability to subject said wafer to known pressure impulses in response to a predetermined pulsed magnetic field applied thereto.

2. A gauge for measuring fluid pressure pulses, comprising a piezoelectric crystal wafer, means for holding said crystal wafer in a fixed position with one face extending generally perpendicular to the direction of the pressure pulses to be measured, a first elongated acoustic transmission line for carrying pressure pulses to be measured extending from the one face of said wafer, a second elongated acoustic transmission line extending from the opposite face of said wafer, means for indicating an electrical property of said crystal wafer which is changed by said pressure pulses, and a conductive member at the outer end of said first transmission line for calibrating said indicating means against standard pressure pulses, said conductive member being characterized by the ability to subject said first transmission line to known pressure impulses in response to a predetermined pulsed magnetic field applied thereto.

3. A gauge for measuring pressure pulses, comprising a pair of longitudinally aligned rods, a piezoelectric crystal wafer sandwiched between said rods whereby pressure pulses which are applied to an outer end of one of the rods and are transmitted to the wafer by said one rod are converted into a difference in electrical potential between opposite faces of said wafer, metallic sheets interposed between the faces of said wafer and the adjacent ends of said rods, voltage indicating means connected to said metallic sheets, and a disc of conductive material at said outer end of said one rod for calibrating said indicating means against standard pressure pulses, said disc being characterized by the ability to subject said one rod to known pressure impulses in response to a predetermined pulsed magnetic field applied thereto.

4. A gauge for measuring pressure pulses, comprising a piezoelectric crystal wafer, means for holding said crystal wafer in a fixed position with one face extending generally perpendicular to the direction of the pressure pulses to be measured, an elongated acoustic, transmission line extending from at least one face of said wafer, means for indicating an electrical property of said crystal wafer which is changed by the pressure pulses, and a conducting disc in acoustical communication with the one face of said wafer for calibrating said indicating means against standard pressure pulses, said disc being characterized by the ability to subject said wafer to known pressure impulses in response to a predetermined pulsed magnetic field applied thereto.

5. A gauge for measuring fluid pressure pulses, comprising a pair of longitudinally aligned rods, a piezoelectric crystal wafer sandwiched between said rods whereby pressure pulses which are applied to an outer end of one of said rods and are transmitted to the wafer by said one rod are converted into a difference in electrical potential between opposite faces of said wafer, said wafer having a resonant frequency which is large compared to the frequency of the pressure pulses, metallic sheets interposed between the faces of said wafer and the adjacent ends of said rods, voltage indicating means connected to said metallic sheets, and a conducting disc connected to said outer end of said one rod for calibrating said indicating means against standard pressure pulses, said disc being characterized by the ability to subject said one rod to known pressure impulses in response to a predetermined pulsed magnetic field applied thereto.

6. A gauge for measuring pressure pulses, comprising a pair of longitudinally aligned rods, a piezoelectric crystal wafer sandwiched between said rods whereby pressure pulses which are applied to an outer end of one of said rods and are transmitted to the wafer by said one rod are converted into a difference in electrical potential between opposite faces of said crystal wafer, metallic sheets interposed between the faces of said wafer and the adjacent ends of said rods, indicating means connected to said metallic sheets, and a conducting disc connected to said outer end of said one rod for calibrating said indicating means against standard pressure pulses, said disc being characterized by the ability to subject said one rod to known pressure impulses in response to a predetermined pulsed magnetic field applied thereto.

7. A method of calibrating a pressure measuring gauge which includes a pressure sensitive element, means for indicating the change in pressure at the sensitive element, and a metallic plate connected to the sensitive element so that pressure on the metallic plate produces a pressure on the sensitive element, said method comprising supporting the gauge so that the plate is positioned at a predetermined distance from a coil of conductive material, passing a current pulse through the coil thereby generating a magnetic field which intersects the plate, recording the change in pressure at the pressure sensitive element, determining the amount of pressure produced by the magnetic pulse by removing the plate from the sensitive element, positioning the plate at the said predetermined distance relative to the coil, passing a current pulse through the coil equal to the first mentioned current pulse, determining the height to which the plate is lifted against gravity in the absence of air friction, and calculating the strength of the impulse by using the height obtained, and determining the calibrating constant of the gauge from the impulse and the recorded change in pressure at the sensitive element.

8. A method of calibrating a pressure measuring gauge which includes a piezoelectric crystal wafer, a metallic plate connected to the wafer so that pressure on the plate produces a pressure on the wafer, and means at the wafer for indicating the change in potential caused by the pressure, said method comprising supporting the gauge so that the plate is abutting the upper surface of a coil of conductive material, passing a current pulse through the coil thereby generating a pulsed magnetic field which intersects the plate, recording the change in potential at the wafer, determining the amount of pressure produced by the magnetic pulse by removing the plate from the sensitive element, positioning the plate on the upper surface of the coil, passing a current pulse through the coil equal to the first current pulse, determining the height to which the plate is lifted against gravity in the absence of air friction, and calculating the strength of the impulse by using the height obtained, and determining the calibrating constant of the gauge from the impulse and the recorded change in potential.

9. A method of calibrating a pressure measuring gauge which includes a pressure sensitive element, and means for indicating a change in pressure at the sensitive element, said method comprising connecting a conductive plate member to the sensitive element so that pressure on the plate member produces a pressure on the sensitive element, fixedly supporting said pressure sensitive element, applying a predetermined pulsed magnetic field to said plate member thereby producing a pressure impulse on the plate member, recording the resulting change of the indicating means, separating said plate member from said sensitive element, applying a magnetic field to said plate member similar to the previously applied predetermined magnetic field, and determining the amount of pressure produced at the plate member by the magnetic pulse whereby the pressure sensitive element may be calibrated.

References Cited in the file of this patent
UNITED STATES PATENTS

| | | |
|---|---|---|
| 1,955,471 | Pooler | Apr. 17, 1934 |
| 2,569,987 | Frondel | Oct. 2, 1951 |
| 2,636,134 | Arons et al. | Apr. 21, 1953 |
| 2,895,061 | Probus | July 14, 1959 |

UNITED STATES PATENT OFFICE
CERTIFICATE OF CORRECTION

Patent No. 3,029,643                           April 17, 1962

Martin O. Stern

It is hereby certified that error appears in the above numbered patent requiring correction and that the said Letters Patent should read as corrected below.

Column 2, line 43, for "which" read -- with --; column 3, line 58, for "device" read -- devices --.

Signed and sealed this 28th day of August 1962.

(SEAL)
Attest:

ESTON G. JOHNSON
Attesting Officer

DAVID L. LADD
Commissioner of Patents